(12) United States Patent
Mokheimer et al.

(10) Patent No.: US 10,408,128 B2
(45) Date of Patent: Sep. 10, 2019

(54) SOLAR ASSISTED GAS TURBINE DESALINATION AND CARBON CAPTURE SYSTEM

(71) Applicant: KING FAHD UNIVERSITY OF PETROLEUM AND MINERALS, Dhahran (SA)

(72) Inventors: Esmail Mohamed Ali Mokheimer, Dhahran (SA); Mohamed Abdel Aziz Habib, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 182 days.

(21) Appl. No.: 15/142,836

(22) Filed: Apr. 29, 2016

(65) Prior Publication Data
US 2017/0314466 A1 Nov. 2, 2017

(51) Int. Cl.
*F02C 6/18* (2006.01)
*F01K 23/10* (2006.01)
(Continued)

(52) U.S. Cl.
CPC ............. *F02C 6/18* (2013.01); *B01D 1/0058* (2013.01); *B01D 1/26* (2013.01); *B01D 3/06* (2013.01);
(Continued)

(58) Field of Classification Search
CPC ........ F01K 17/02; F01K 17/025; F01K 23/06; F01K 23/064; F01K 23/10; F02C 6/18; Y02E 20/14; Y02E 20/16
See application file for complete search history.

(56) References Cited

U.S. PATENT DOCUMENTS

| 8,674,532 B2 | 3/2014 | Wei et al. |
| 2011/0077447 A1* | 3/2011 | Groothuis .......... B01D 53/1425 585/823 |

(Continued)

FOREIGN PATENT DOCUMENTS

| CN | 102762501 A | 10/2012 |
| EP | 2 955 372 A2 | 12/2015 |

(Continued)

OTHER PUBLICATIONS

Takeuchi JP61141985A.*
(Continued)

*Primary Examiner* — Scott J Walthour
(74) *Attorney, Agent, or Firm* — Oblon, McClelland, Maier & Neustadt, L.L.P.

(57) ABSTRACT

A system for generating electricity, heat, and desalinated water having a gas turbine system connected to a first electric generator, a waste heat recovery boiler (WHRB) system, a combined heat and power (CHP) generation system connected to a second electric generator, one or more solar powered energy systems, and a desalination system. The desalination system is connected to the CHP generation system and the WHRB system. The gas turbine system generates electricity and heat, the WHRB system is connected to and uses the exhaust of the gas turbine system to provide heat and steam power to the CHP generation system. The CHP generation system produces and provides electricity and heat to the desalination system, which produces product water, and at least one solar powered energy system provides thermal energy to one or more of the gas turbine system, the WHRB system, the CHP generation system, and the desalination system.

16 Claims, 10 Drawing Sheets

(51) Int. Cl.

| | | |
|---|---|---|
| *C02F 1/06* | (2006.01) | |
| *B01D 3/06* | (2006.01) | |
| *B01D 61/02* | (2006.01) | |
| *F01K 17/02* | (2006.01) | |
| *F01K 23/06* | (2006.01) | |
| *B01D 1/00* | (2006.01) | |
| *B01D 1/26* | (2006.01) | |
| *F03G 6/06* | (2006.01) | |
| *F02C 1/05* | (2006.01) | |
| *F22B 1/00* | (2006.01) | |
| *F22B 1/18* | (2006.01) | |
| *C02F 9/00* | (2006.01) | |
| *C02F 1/44* | (2006.01) | |
| *C02F 103/08* | (2006.01) | |
| *C02F 1/14* | (2006.01) | |
| *C02F 1/16* | (2006.01) | |

(52) U.S. Cl.
CPC ......... *B01D 61/025* (2013.01); *B01D 61/027* (2013.01); *C02F 1/06* (2013.01); *C02F 9/00* (2013.01); *F01K 17/02* (2013.01); *F01K 17/025* (2013.01); *F01K 23/06* (2013.01); *F01K 23/10* (2013.01); *F01K 23/103* (2013.01); *F02C 1/05* (2013.01); *F03G 6/064* (2013.01); *F03G 6/067* (2013.01); *F22B 1/006* (2013.01); *F22B 1/1815* (2013.01); *B01D 2311/2669* (2013.01); *B01D 2317/025* (2013.01); *C02F 1/14* (2013.01); *C02F 1/16* (2013.01); *C02F 1/441* (2013.01); *C02F 1/442* (2013.01); *C02F 2103/08* (2013.01); *C02F 2201/009* (2013.01); *C02F 2301/08* (2013.01); *C02F 2303/10* (2013.01); *F01K 23/064* (2013.01); *F05D 2220/64* (2013.01); *F05D 2220/72* (2013.01); *Y02A 20/128* (2018.01); *Y02A 20/129* (2018.01); *Y02A 20/131* (2018.01); *Y02A 20/142* (2018.01); *Y02A 20/212* (2018.01); *Y02E 10/46* (2013.01); *Y02E 20/14* (2013.01); *Y02E 20/16* (2013.01); *Y02P 70/34* (2015.11); *Y02W 10/30* (2015.05)

(56) References Cited

U.S. PATENT DOCUMENTS

| | | | |
|---|---|---|---|
| 2011/0100004 A1* | 5/2011 | Al-Mazeedi | G05B 13/021 60/641.8 |
| 2011/0137479 A1 | 6/2011 | Al-Mazeedi | |
| 2011/0153087 A1* | 6/2011 | Cohen | F03G 6/067 700/275 |
| 2011/0171093 A1* | 7/2011 | Rochelle | B01D 53/1456 423/228 |
| 2012/0192564 A1* | 8/2012 | Mishima | B01D 53/1425 60/676 |

FOREIGN PATENT DOCUMENTS

| | | | | |
|---|---|---|---|---|
| GB | 2 449 181 A | | 11/2008 | |
| JP | 61141985 A | * | 6/1986 | ............ B01D 3/065 |
| JP | 4370284 B2 | | 11/2009 | |

OTHER PUBLICATIONS

English translation of specification from Takeuchi JP61141985A.*
Claire Soares, "Gas Turbines in Simple Cycle & Combined Cycle Applications", Gas Turbines: A Handbook of Land, Sea and Air Applications, Oct. 24, 2014, 74 pages.
"Small Power Generation for Industrial Applications", GE Oil & Gas, Oct. 2006, 8 pages.
"Renewable Energy Technologies: Cost Analysis Series", Irena International Renewable Energy Agency, Solar Photovoltaics, vol. 1: Power Sector, Issue 4/5, Jun. 2012, 52 pages.
"Energy cost calculator, Calculation of energy cost per gigajoule (GJ)", http://ramblingsdc.net/EnCalcs.html, May 8, 2005, 9 pages.
"Carbon Dioxide Emissions from the Generation of Electric Power in the United States", Department of Energy, Environmental Protection Agency, Jul. 2000, 21 pages.
"$SR_{4.5}$bn Saudi solar revolution", Arab News, http://www.arabnews.com/featured/news/682436, Dec. 31, 2014, 3 pages.
Esmail M. A. Mokheimer, et al., "Optimal integration of solar energy with fossil fuel gas turbine cogeneration plants using three different CSP technologies in Saudi Arabia", Applied Energy, Dec. 31, 2015, 2 pages (Abstract only).

* cited by examiner

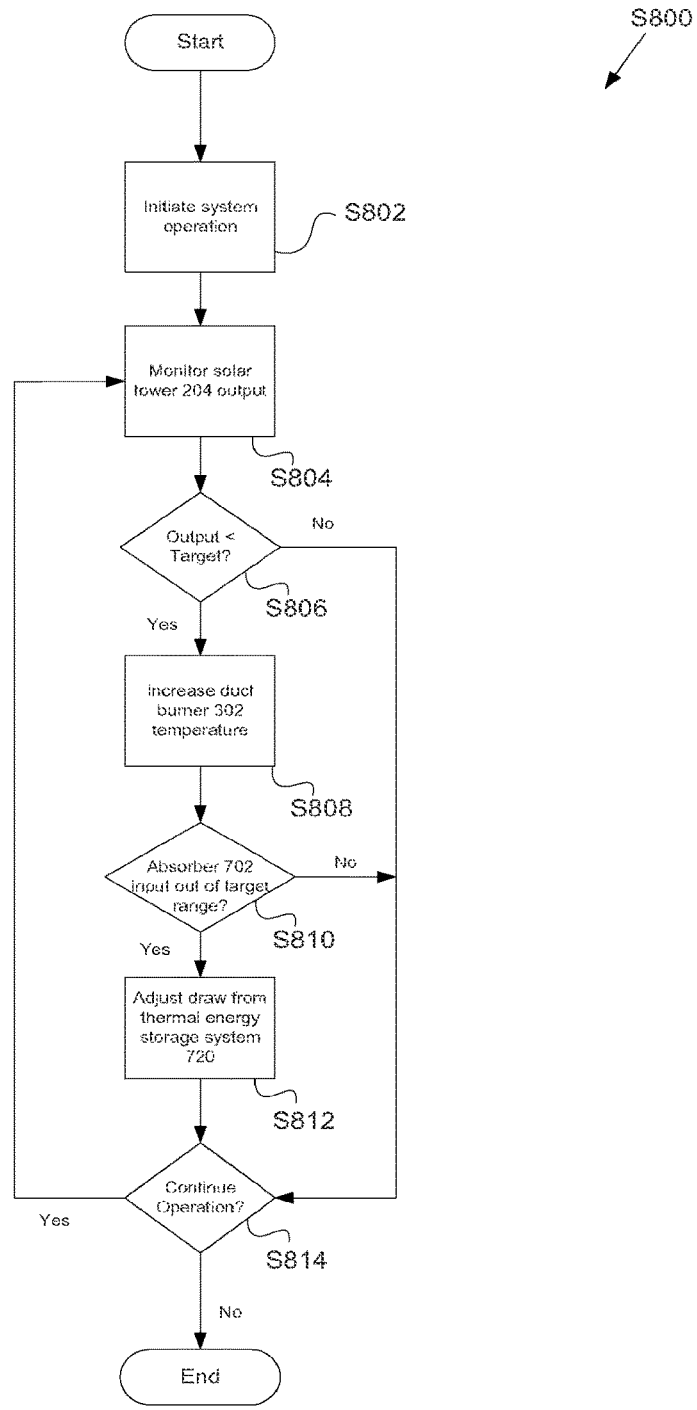

US 10,408,128 B2

SOLAR ASSISTED GAS TURBINE DESALINATION AND CARBON CAPTURE SYSTEM

BACKGROUND

Field of the Disclosure

The present disclosure is directed toward a solar power assisted electric, heat, and desalinated water generating system and method.

Description of the Related Art

The need to improve upon the prior art in the field of water desalination has resulted in the introduction of systems and methods to produce desalinated water from seawater while balancing various operational and efficiency parameters.

The art continues to be developed with the aim of improving capabilities of industrial scale systems and methods for desalinating water and generating electricity during operation in a variety of conditions and, at the same time, minimizing the energy input and other resources needed to meet the stated needs.

SUMMARY

A system for generating electricity, heat, and desalinated water having a gas turbine system connected to a first electric generator, a waste heat recovery boiler (WHRB) system, a combined heat and power (CHP) generation system connected to a second electric generator, one or more solar powered energy systems, and a desalination system. The desalination system is connected to the CHP generation system and the WHRB system. The gas turbine system generates electricity and heat, the WHRB system is connected to and uses the exhaust of the gas turbine system to provide heat and steam power to the CHP generation system. The CHP generation system produces and provides electricity and heat to the desalination system, which produces product water, and at least one solar powered energy system provides thermal energy to one or more of the gas turbine system, the WHRB system, the CHP generation system, and the desalination system.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 9 is an operating diagram of a set of a power generation and water desalination process performed by an operation control system, according to one example.

DETAILED DESCRIPTION OF THE EMBODIMENTS

Figure 1:
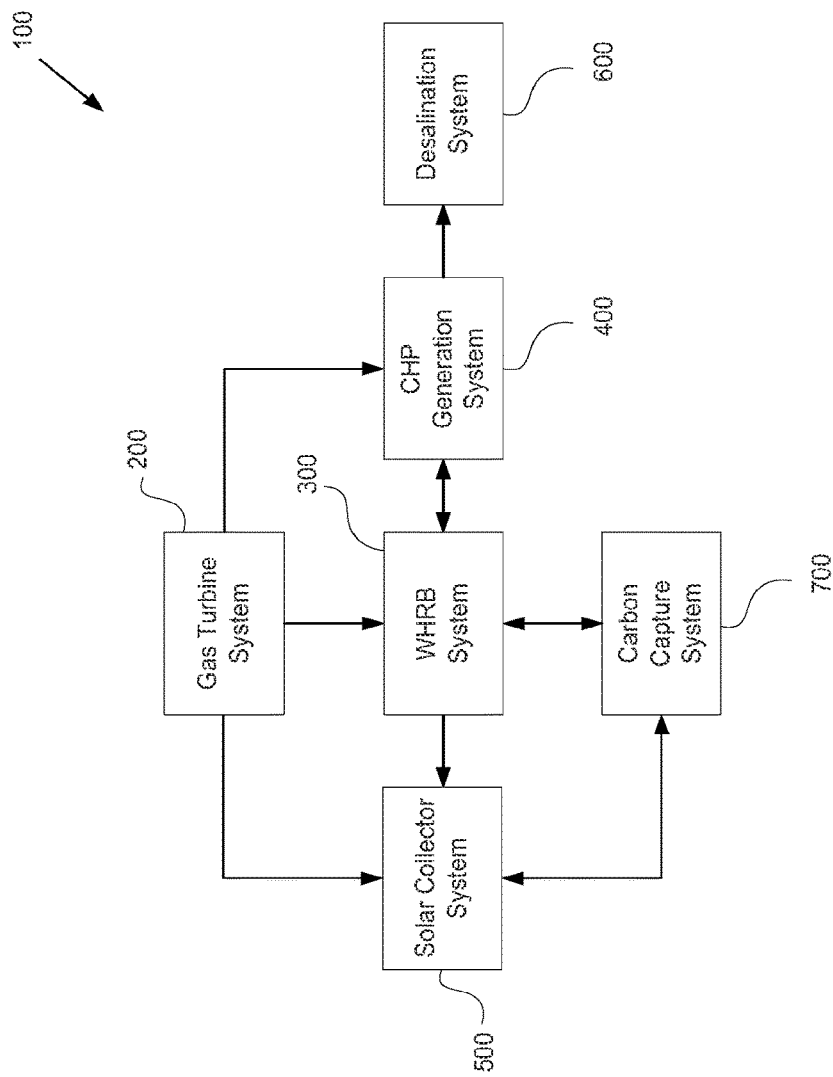
FIG. 1 is a diagram of a power generation and water desalination system, according to one example.

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

FIG. 1 is a diagram of a power generation and water desalination system 100, according to one example. The power generation and water desalination system includes a gas turbine system 200, a WHRB system 300, a CHP generation system 400, a solar collector system 500, a desalination system 600, and a carbon capture system 700. The WHRB system 300 is connected to the gas turbine system 200 and disposed downstream of the gas turbine system 200. The WHRB system 300 is further connected to the CHP generation system 400, the solar collector system 500, the desalination system 600, and the carbon capture system 700.

The gas turbine system 200 may produce electricity and waste heat. The waste heat may be directed to the WHRB system 300 to recover a portion of energy that would otherwise be lost to the atmosphere. The WHRB system 300 may use waste heat from the gas turbine system 200 to power a CHP generation system 400. The WHRB system 300 may also use heat supplied by the solar collector system 500 to further augment the energy available to power the CHP generation system 400. Waste heat, in the form of flue gas, recovered from the gas turbine system 200 may then be directed from the WHRB system 300 to the carbon capture system 700.

The CHP generation system 400 produces electricity and waste heat. A portion of the electricity and the waste heat may be supplied to the desalination system 600 to produce product water. The remaining electricity may be provided to an electric utility network while a portion of the remaining waste heat may be redirected to the WHRB system 300 to maintain overall efficiency of the power generation and water desalination system 100.

The carbon capture system 700 captures and separates carbon dioxide from flue gas originating in the gas turbine system 200. The carbon dioxide may then be collected and used for other purposes instead of being released into the atmosphere. Some or all of the energy to operate the carbon capture system 700 may come from solar powered sources.

Further, any description of the power generation and water desalination system 100 or subsystems of the power generation and water desalination system 100 that is described herein using water as a fluid for transferring heat may also use an alternative fluid, for example a refrigerant, coolant, heat transfer fluid, or water-based compound that can undergo phase transitions as part of a heat transfer process.

Figure 2:
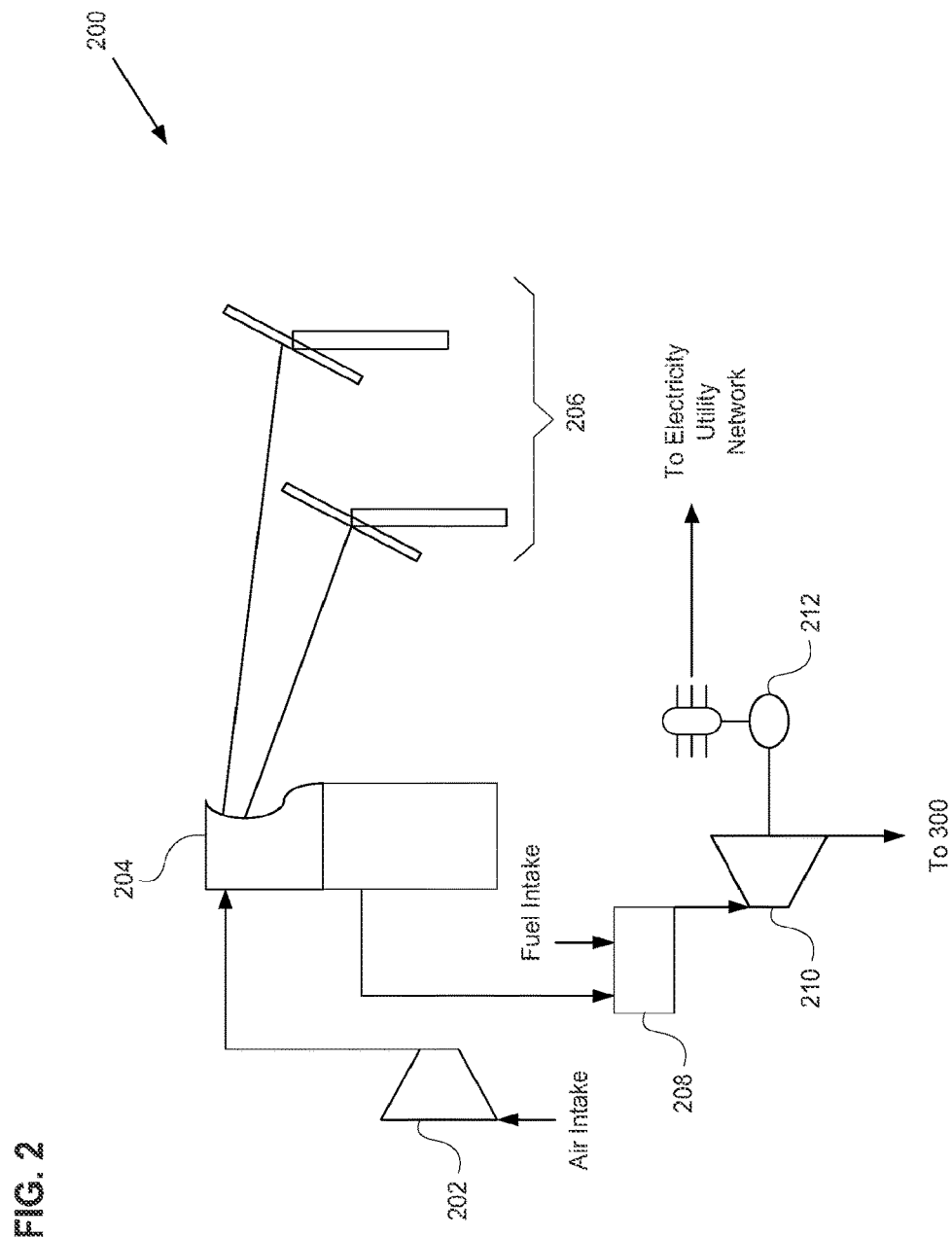
FIG. 2 is a diagram of a gas turbine system, according to one example.

FIG. 2 is a diagram of a gas turbine system 200, according to one example. An air compressor 202, a solar tower 204, a plurality of heliostats 206, a combustion chamber 208, a gas turbine 210, and an electric generator 212 are connected to comprise the gas turbine system 200. The air compressor 202 receives air, nominally at atmospheric pressure, and compresses the air to an air pressure higher than atmospheric. Compressed air may then be directed through a solar tower 204 that heats the compressed air, further increasing the air pressure. The solar tower 204 may receive concentrated thermal energy from a plurality of heliostats 206 directing sunlight into the solar tower 204. At least one of the plurality of heliostats 206 may be able to move or rotate such that the heliostat 206 is able to concentrate and direct a greater portion of sunlight received during daylight hours to the solar tower 204 than if the at least one of the plurality of heliostats 206 were not able to move or rotate. The solar tower 204 may then heat the flow of compressed air passing from the air compressor 202. Compressed air allows a greater amount of fuel to be mixed with the compressed air while maintaining a desirable air/fuel ratio thus producing greater output power. Compressed air from the solar tower 204 may then be directed into the combustion chamber 208 where it is mixed with fuel and then the air/fuel mixture may be directed to the gas turbine 210. The gas turbine 210 may be connected to and drive the electric generator 212 to produce electrical energy. Further, waste heat from the operation of the gas turbine 210 may be directed to the WHRB system 300.

Figure 3:
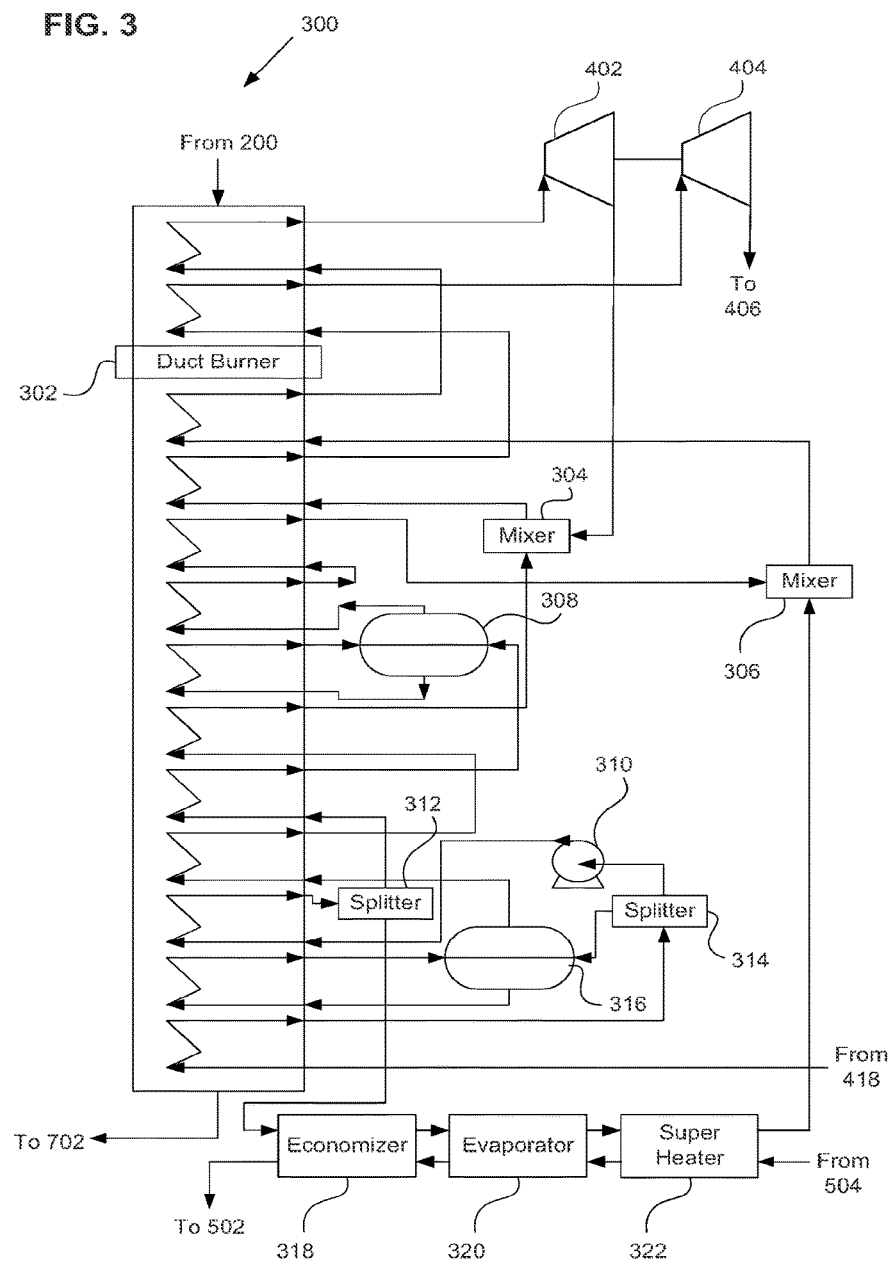
FIG. 3 is a diagram of a Waste Heat Recovery Boiler (WHRB) system, according to one example.

FIG. 3 is a diagram of a WHRB system 300, according to one example. A duct burner 302, a mixer 304, a mixer 306, a steam boiler 308, a pump 310, a splitter 312, a splitter 314, a steam boiler 316, an economizer 318, an evaporator 320, and a super heater 322 are connected to comprise the WHRB system 300. Flue gas from the gas turbine system 200 may be directed through the WHRB system 300, heating the duct burner 302, the steam boiler 308, and the steam boiler 316 along the way as the flue gas flows to the absorber 702 of the carbon capture system 700. As will be understood by one having ordinary skill in the art, as the flue gas flows through the WHRB system 300 from the gas turbine system 200 to the carbon capture system 700, and passes the duct burner 302, the steam boiler 308, and the steam boiler 316, fluid circulating within the steam boiler 308 and the steam boiler 316, for example water or steam, will rise in temperature. Fluid circulating in the WHRB system 300 is circulated from a feed water pump 418 through the splitter 314. From the splitter 314 fluid may be circulated to the pump 310 and the steam boiler 316. The pump 310 further circulates fluid to the splitter 312 where a portion of the fluid may be directed to the steam boiler 308 and a portion of the fluid may be directed to the economizer 318. From the steam boiler 308 fluid may be further heated and then directed to the mixer 306 where the fluid is combined with fluid exiting the super heater 322, is further heated as it is directed around the duct burner 302, and then to the high pressure turbine 402 of the CHP generation system 400. Fluid from the steam boiler 316 is recirculated to the steam boiler 316, heated by flue gas, and then directed to the mixer 304. Fluid exiting the mixer 304 may be further heated as it is directed around the duct burner 302, and into the intermediate pressure turbine 404 of the CHP generation system 400.

Figure 4:
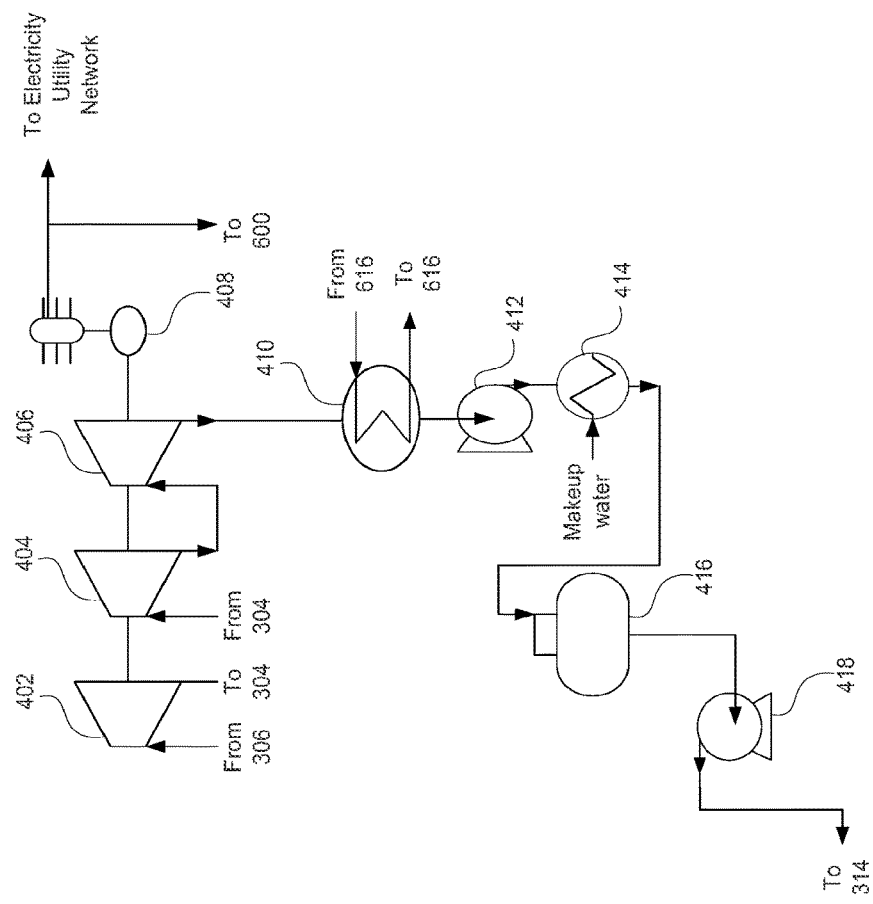
FIG. 4 is a diagram of a Combined Heat and Power (CHP) generation system, according to one example.

FIG. 4 is a diagram of a CHP generation system 400, according to one example. The CHP generation system 400 comprises a high pressure turbine 402, an intermediate pressure turbine 404, a low pressure turbine 406, an electric generator 408, a condenser 410, a condenser pump 412, a water intake 414, a dearator 416, and the feed water pump 418. The high pressure turbine 402 is connected to the intermediate pressure turbine 404, and the intermediate pressure turbine 404 is connected to the low pressure turbine 406, where steam may enter the high pressure turbine 402 from the mixer 306 of the WHRB system 300 to power the high pressure turbine 402. Steam exits the high pressure turbine 402 and may be directed back to the mixer 304 of the WHRB system 300.

Steam from the mixer 304 of the WHRB system 300 may be directed to and power the intermediate pressure turbine 404. Steam exits the intermediate pressure turbine 404 and may be directed into the low pressure turbine 406, further enhancing the efficiency of the CHP generation system 400. Steam exits the low pressure turbine 406 and may be directed through the condenser 410 where the steam may condense to water while heating a separate fluid from the desalinator 616 of the desalination system 600. Water from the condenser 410 may be pumped by the condenser pump 412 past the water intake 414 where additional makeup water is added to compensate for water lost during operation of the power generation and water desalination system 100. Then the water may be directed through the dearator 416 for removal of oxygen and other dissolved gases, whereupon the feed water pump 418 may pump the water back to the splitter 314 of the WHRB system 300.

Further, operation of the high pressure turbine 402, the intermediate pressure turbine 404, and the low pressure turbine 406 drives the electric generator 408 and produces electricity. A portion of the electricity is directed to power the desalination system 600, and the remainder may be directed to an electric utility network.

Figure 5:
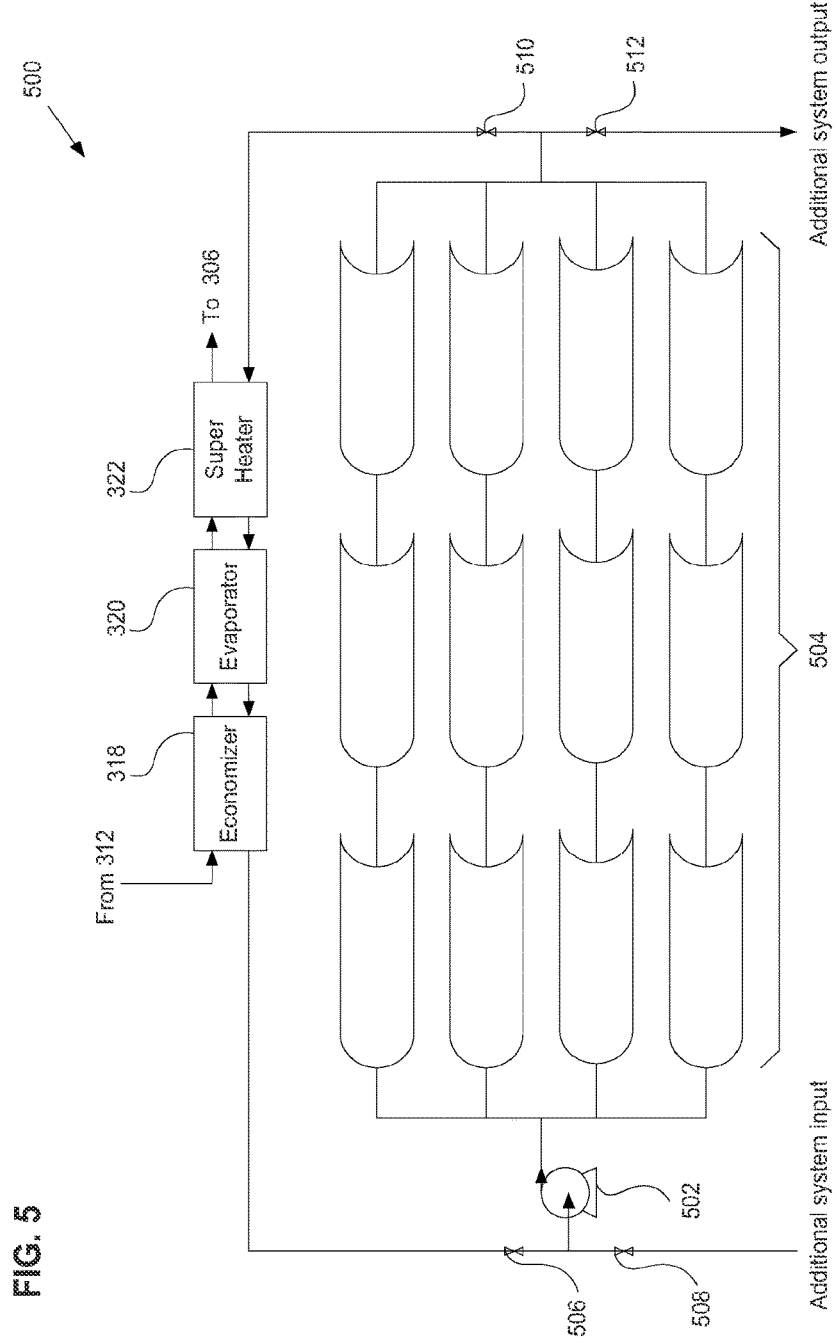
FIG. 5 is a diagram of a solar collector system, according to one example.

FIG. 5 is a diagram of a solar collector system 500, according to one example. An HTF pump 502 and a plurality of solar troughs 504 are connected to comprise the solar collector system 500, the solar collector system 500 may also be connected to the economizer 318, the evaporator 320, and the super heater 322 of the WHRB system 300. The plurality of solar troughs 504 may be connected to each other in series, parallel, or a combination of both A Heat Transfer Fluid (HTF) may be pumped by the HTF pump 502 through the plurality of solar troughs 504 and heated by at least one of the parabolic mirrors within the plurality of solar troughs 504. The HTF may then flow through the super heater 322, then the evaporator 320, and then the economizer 318, cooling as the HTF flows and transfers heat to the water in the WHRB system 300. As the HTF exits the economizer 318 the HTF may be directed back to the HTF pump 502 to repeat the cycle. Water from the splitter 312 of the WHRB system 300 may be directed to flow through the economizer 318, then the evaporator 320, and then the super heater 322. Water from the WHRB system 300 exiting the super heater 322 may be directed back to the mixer 306.

Further, the solar collector system 500 may comprise a proportioning valve 506 and a proportioning valve 508 disposed upstream of the HTF pump 502, and a proportioning valve 510 and a proportioning valve 512 downstream of the HTF pump 502, allowing the solar collector system 500 to provide thermal energy to additional systems in addition to the WHRB system 300, for example the desalination system 600 and the carbon capture system 700. The proportioning valves 506, 508, 510, and 512 may be configured to be operated manually or electronically.

In one example, the proportioning valve 506 and the proportioning valve 510 are open, and the proportioning valve 508 and the proportioning valve 512 are closed. Circulation of the HTF within the solar collector system 500 is used for heating the WHRB system 300.

In another example, the proportioning valve 506 and the proportioning valve 510 are closed, and the proportioning valve 508 and the proportioning valve 512 are open. Circulation of the HTF within the solar collector system 500 is used for heating at least one additional system other than the WHRB system 300, for example the desalination system 600 or the carbon capture system 700.

In another example, the proportioning valve 506, the proportioning valve 508, the proportioning valve 510, and the proportioning valve 512 are open. Circulation of the HTF within the solar collector system 500 is used for heating the WHRB system 300 and at least one additional system, for example the desalination system 600 and the carbon capture system 700.

Figure 6:
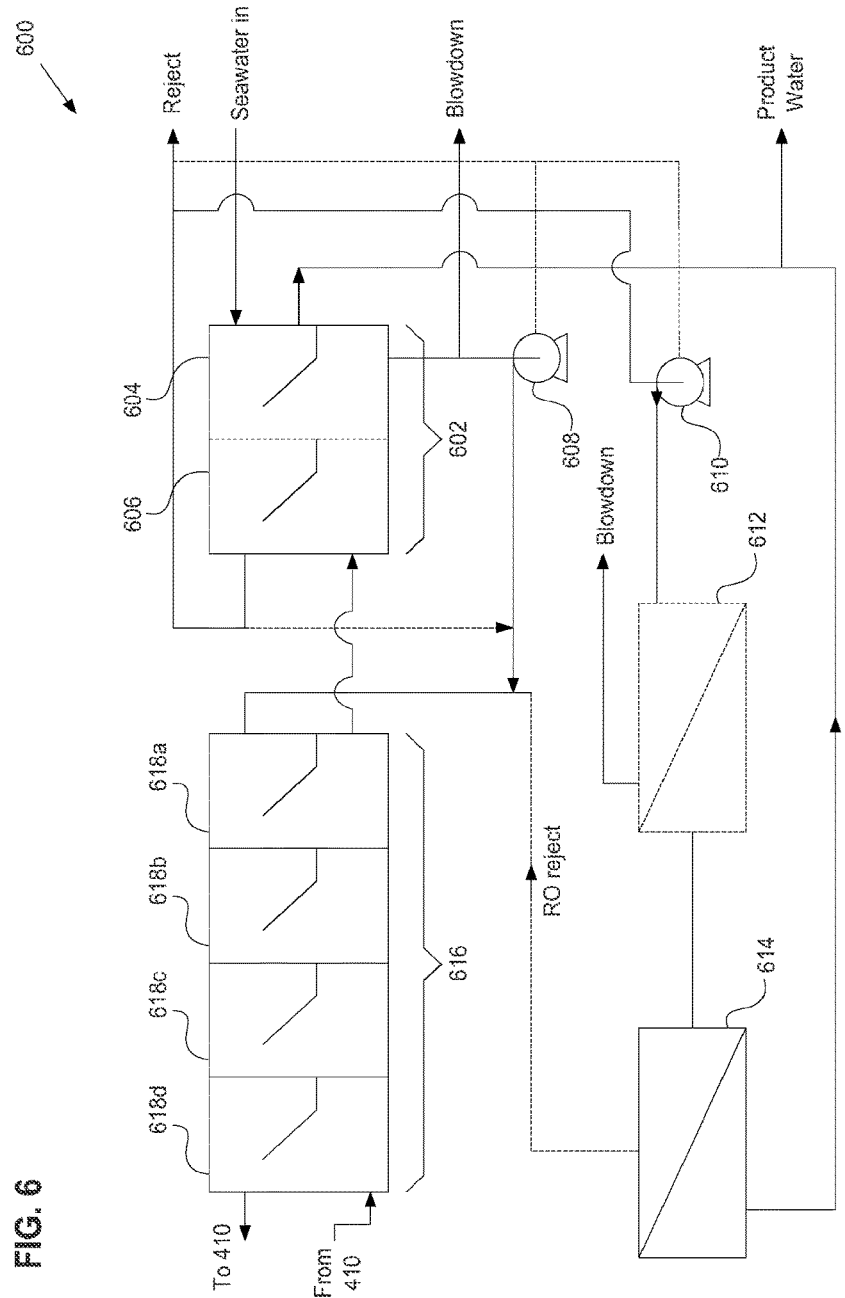
FIG. 6 is a diagram of a desalination system, according to one example.

FIG. 6 is a diagram of a desalination system 600, according to one example. The desalination system 600 comprises a rejection section 602, a pump 608, a pump 610, a nano filtration system 612, a reverse osmosis system 614, and a desalinator 616. The rejection section 602 further comprises a section 604 and a section 606. The desalinator 616 further comprises a plurality of sections 618.

Seawater enters the section 604 of the rejection section 602 before it is directed through the section 606. Both the section 604 and the section 606 are heated by returning brine from the desalinator 616 and brine condensate is collected within the rejection section 602. A portion of the seawater is rejected from the system, condensing as it exits the rejection section 602 at the section 606 and may then be pumped by the pump 608 to the desalinator 616, as is the returning brine that exits the section 604. The remainder condenses into product water, which is desalinated, that may be directed out of the system for further use.

A portion of the seawater rejected by the rejection section 602 may also condense and be added back into the system by the pump 610, which pumps the rejected water into the nano filtration system 612 to filter the water. The nano filtration system 612 produces seawater and blowdown, with the blowdown rejected from the nano filtration system 612 and out of the system, while seawater from the nano filtration system 612 may be directed into the reverse osmosis system 614. The outputs of the reverse osmosis system 614 may be product water, which is desalinated, and steam. The product water of the reverse osmosis system 614 may be combined with the product water of the rejection section 602 and directed out of the system for further use. The steam exiting the reverse osmosis system 614 may condense and combine with the brine redirected from the rejection section 602 and the condensate of the rejected water of the rejection section 602, and is then pumped into the desalinator 616 by the pump 608.

The water entering the 618a then flows through the plurality of sections 618 within the desalinator 616, each of the sections 618 having progressively higher temperature and pressure than the preceding section 618. The water then exits the desalinator 616 at the 618d and enters the condenser 410 as a first stream of water. Heat energy is added from a separate, second stream of returning condensate flow through the condenser 410 (FIG. 4) between the low pressure turbine 406 and the condenser pump 412. The first stream of water is then redirected from the condenser 410 back into the desalinator 616 as brine. The brine is then routed through the plurality of sections 618 of the desalinator 616 toward the section 606 of the rejection section 602. The 618d has a higher internal temperature and a higher internal pressure than that of the 618c. The 618c has a higher internal temperature and a higher internal pressure than that of the 618b, and the 618b has a higher internal temperature and a higher internal pressure than that of the 618a.

The brine may flow through each of the sections 618. Because the temperature of the brine is greater than that within the each section 618, a portion of the brine vaporizes which reduces the brine temperature to equilibrium within each particular section 618 while also heating the first stream of water flowing in the opposite direction from the 618a through the 618d toward the condenser 410.

The brine then flows out of the desalinator 616 and into the section 606 of the rejection section 602 where the brine heats a separate, incoming stream of seawater before the brine may be directed to the pump 608 and pumped by the pump 608 back toward the desalinator 616.

Figure 7A:
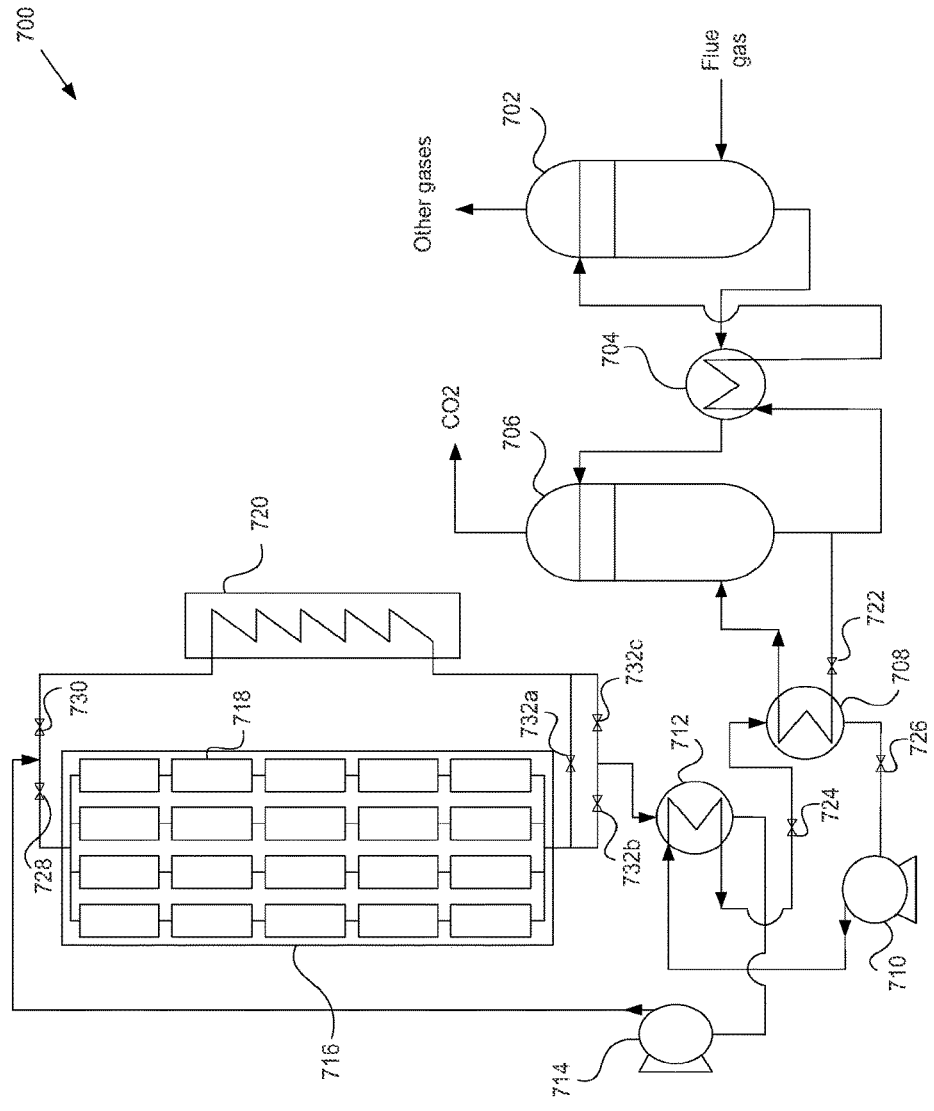
FIG. 7A is a diagram of a carbon capture system, according to one example.

FIG. 7A is a diagram of a carbon capture system 700, according to one example. The carbon capture system 700 comprises an absorber 702, a heat exchanger 704, a stripper 706, a reboiler 708, a pump 710, a heat exchanger 712, a pump 714, a solar energy collector 716, and a thermal energy storage system 720. The solar energy collector 716 further comprises a plurality of solar cells 718 that may be connected to each other in series, parallel, or a combination of both.

Flue gas from the gas turbine system 200 may be directed through the WHRB system 300 to recapture a portion of the waste heat before entering the carbon capture system 700 to separate carbon dioxide from other gases in the flue gas. The flue gas enters the absorber 702 where the carbon dioxide is absorbed by a solvent, for example lithium hydroxide lime, calcium hydroxide, or barium hydroxide, while other gases may be vented or diverted elsewhere. The carbon dioxide rich solvent may then be routed from the absorber 702 to the stripper 706, passing through the heat exchanger 704 in the process. The carbon dioxide rich solvent is heated as it passes the heat exchanger 704 by a lean carbon dioxide solvent that is flowing from the stripper 706 back through the heat exchanger 704 to the absorber 702.

In the stripper 706 the carbon dioxide rich solvent may be separated into carbon dioxide and the lean carbon dioxide solvent. The lean carbon dioxide solvent portion may be routed out of the stripper 706, through the heat exchanger 704 for heating and then into the absorber 702. Some or all of the lean carbon dioxide solvent portion exiting the stripper 706 may also be routed through the reboiler 708, further heated, and then added back into the stripper 706 for additional removal of carbon dioxide from the lean carbon dioxide solvent.

Heat energy may be added to the reboiler 708 from a variety of energy sources, including solar heat. In one example, heat energy may originate from sunlight that is received by the plurality of solar cells 718 that comprise the solar energy collector 716. Further, energy collected by the solar energy collector 716 may first be transferred to the thermal energy storage system 720 for storage and added to the heat exchanger 712 and the reboiler 708 at a later time, for example at night. The thermal energy storage system 720 extends the time the carbon capture system 700 may function using solar energy by decoupling time of collection of solar energy with time of use of said energy.

Solar energy stored within a working fluid contained within the solar energy collector 716 or the thermal energy storage system 720 may be routed through the heat exchanger 712 to heat condensate that is routed from the reboiler 708 to the heat exchanger 712 by the pump 710. Separately, the working fluid may then be routed from the heat exchanger 712 by the pump 714 which pumps it back into the solar energy collector 716 or thermal energy storage system 720, forming a closed loop.

Condensate pumped into the heat exchanger 712 is converted into steam by heat transferred from the working fluid. The steam may then be routed through the reboiler 708, heating the lean carbon dioxide solvent returning to the stripper 706. The steam condenses again and is returned to the heat exchanger 712 by the pump 710.

The carbon capture system 700 may further comprise a proportioning valve 722 disposed upstream of the reboiler 708, a proportioning valve 724 downstream of the heat exchanger 712 and upstream of the reboiler 708, a proportioning valve 726 downstream of the reboiler 708 and upstream of the pump 710, a proportioning valve 728 upstream of the solar energy collector 716, a proportioning valve 730 upstream of the thermal energy storage system 720, and a plurality of proportioning valves 732 (732a, 732b, 732c) downstream of the solar energy collector 716 and the thermal energy storage system 720.

In one example, the proportioning valve 728, the proportioning valve 732a, and the proportioning valve 732b may be closed, and the proportioning valve 730 and the proportioning valve 732c open to operate the carbon capture system 700 using only thermal energy stored in the thermal energy storage system 720.

In another example, the proportioning valve 728, the proportioning valve 732a, and the proportioning valve 732b may be open, and the proportioning valve 730 and the proportioning valve 732c closed to operate the carbon capture system 700 using only thermal energy provided by the solar energy collector 716.

In another example, the proportioning valve 728, the proportioning valve 730, the proportioning valve 732a, the proportioning valve 732b, the proportioning valve 732c may be open to operate the carbon capture system 700 using thermal energy provided by both the solar energy collector 716 and the thermal energy storage system 720.

In another example, the proportioning valve 722 is closed and no recirculation of the lean carbon dioxide solvent is recirculated to the stripper 706.

In another example, the thermal energy storage system 720 may be omitted. While this would limit the use of solar energy in the carbon capture system 700 essentially to times when sunlight is available to the plurality of solar cells 718, the system would be simpler and require fewer resources to construct.

In all examples, the proportioning valves (722, 724, 726, 728, 730, 732a, 732b, 732c, 734, 736, 738, and 740) may be configured to be operated manually or electronically.

Figure 7B:
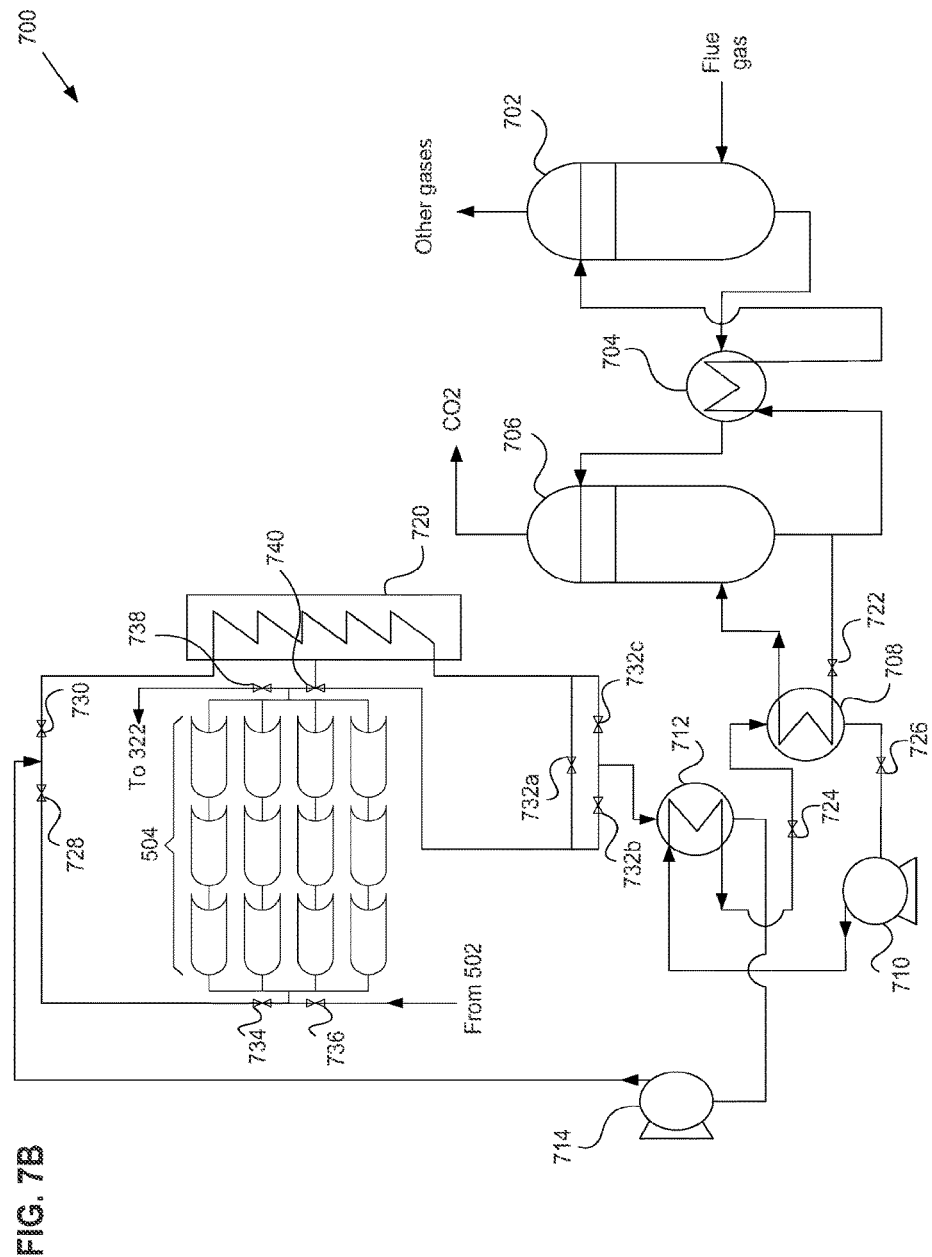
FIG. 7B is a diagram of a carbon capture system, according to one example.

FIG. 7B is a diagram of a carbon capture system, according to one example. The carbon capture system is identical to that of FIG. 7A but with the solar energy collector 716 and the plurality of solar cells 718 omitted. Instead the plurality of solar troughs 504 may be connected to the heat exchanger 712, the pump 714, and the thermal energy storage system 720 to supply solar energy allowing the solar collector system 500 to supply solar energy to more than one subsystem of the power generation and water desalination system 100, for example the gas turbine system 200, the CHP generation system 400, and the carbon capture system 700.

In another example, the plurality of solar troughs 504 is connected to the HTF pump 502 in lieu of the pump 714 of FIG. 7A. Further, in one example the thermal energy storage system 720 may also be omitted for the reasons stated in FIG. 7A.

In another example, the solar collector system 500 may also be connected to the thermal energy storage system 720 such that the solar collector system 500 provides additional solar energy from the plurality of solar troughs 504 to the thermal energy storage system 720 for use in at least one of the carbon capture system 700 and the solar collector system 500.

In another example, the solar collector system 500 may also be connected to the solar tower 204 such that the solar collector system 500 provides additional solar energy from the plurality of solar troughs 504 to the solar tower 204 for use in at least one of the carbon capture system 700 and the gas turbine system 200.

In another example, the solar tower 204 is connected to the thermal energy storage system 720 to allow storage of thermal energy for later use by at least one of the subsystems such as the gas turbine system 200, the WHRB system 300, the CHP generation system 400, the solar collector system 500, the desalination system 600, and the carbon capture system 700.

In another example, the solar collector system 500 may connect to the air compressor 202 and the combustion chamber 208, replacing the solar tower 204 and the plurality of the heliostats 206, such that the solar collector system 500 provides additional solar energy from the plurality of solar troughs 504 to further heat the compressed air as it flows between the air compressor 202 and the combustion chamber 208.

Figure 8:
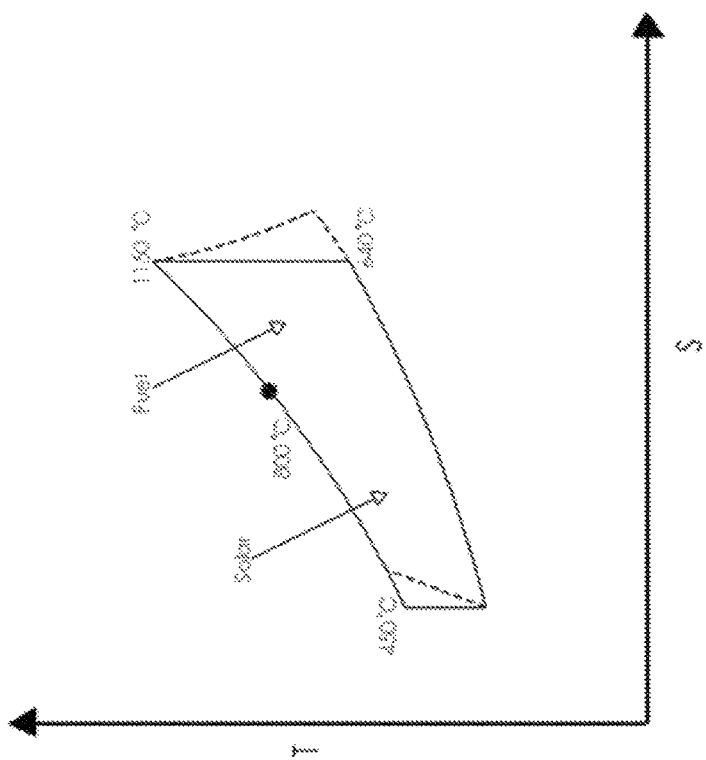
FIG. 8 is a temperature-entropy (T-S) diagram of a Brayton thermodynamic cycle, according to one example.

FIG. 8 is a temperature-entropy (T-S) diagram of a Brayton thermodynamic cycle, according to one example. All values provided below are approximate and exemplary. For a baseline thermodynamic cycle operating according to the exemplary Brayton thermodynamic cycle, running solely on fuel and without solar power, a 1 MW electric output requires about 0.05 kg/s fuel and about 3 kg/s air for combustion. Thus:

Annual energy output =
$$1\frac{MJ}{s} \times \frac{3600 \text{ s}}{\text{hr}} \times \frac{8760 \text{ hr}}{\text{year}} = 31.54 \text{ Tera}\frac{J}{\text{year}} = 31.54 \times 10^6 \text{ }MJ/\text{year}$$

Annual fuel input =
$$0.05\frac{\text{kg}_{fuel}}{s} \times \frac{3600 \text{ s}}{\text{hr}} \times \frac{8760 \text{ hr}}{\text{year}} = 1.58 \times 10^6 \text{ kg}_{fuel}/\text{year}$$

$$\text{Annual energy input} = 1.58 \times \frac{\text{kg}_{fuel}}{\text{year}} \times \frac{42 \text{ }MJ}{\text{kg}_{fuel}} = 66.22 \times 10^6 \text{ }MJ/\text{year}$$

$$\text{Annual air input} = 3\frac{\text{kg}_{air}}{s} \times \frac{3600 \text{ s}}{\text{hr}} \times \frac{8760 \text{ hr}}{\text{year}} = 94.61 \times 10^6 \text{ kg}_{air}/\text{year}$$

Solar Preheating energy input = $\dot{m}_{air} C_{pa}(T_2 - T_1)$
$$= 94.61 \times 10^6 \frac{\text{kg}_{air}}{\text{year}} \times 1.005 \times$$
$$\frac{kJ}{\text{kg}_{air} C} \times (800 - 450)$$
$$= 33.3 \times 10^6 \text{ }MJ/\text{year}$$

For a solar system with thermal storage, the annual energy input savings due to solar preheating of intake air by the solar tower 204 is:

$$= \frac{33.6 \times 10^6 \text{ (solar energy for preheating)}}{66.22 \times 10^6 \text{ (fuel energy required)}} \times 100 =$$

50.25% of annual energy input

Thus the solar energy that may be obtained from the solar tower 204 (with thermal energy storage system 720) leads to fuel savings of about 50% of the annual energy input needed for the baseline Brayton thermodynamic cycle.

Further, the solar collector system 500 comprising a plurality of 504 is used to preheat water before the water enters the WHRB system 300, which allows total savings of input energy of about 65.28% as described below. The use of solar collectors to preheat water before the water enters WHRB system 300 may be calculated as $$= \dot{m}_{water} C_{pw}(T_2 - T_1) = \dot{m}_{air} \frac{\dot{m}_{water}}{\dot{m}_{air}} \times 4.2 \frac{kj}{kg\,C} \times (400 - 150)\,C$$

In many combined cycles, the ratio of the steam flow rate in the steam turbine to the air flow rate in the gas turbine cycle is about 1 kg steam to each 10 kg of air [1, 2]. Thus, the energy required for solar preheating of water is:

$$= \dot{m}_{air} \frac{\dot{m}_{water}}{\dot{m}_{air}} \times 4.2 \frac{kj}{kg\,C} \times (400 - 150)\,C$$

$$= 94.61 \times 10^6 \frac{kg_{air}}{year} \times \frac{1\,kg_{water}}{10\,kg_{air}} \times 4.2 \frac{kj}{kg_{water}\,C} \times 250\,C \times \frac{1\,MJ}{1000\,kJ}$$

$$= 9.93 \times 10^6 \frac{MJ}{year}$$

Thus, the total input energy from the solar tower 204 for a gas turbine cycle and the solar collector system 500 (for a steam cycle) is:

$$= 33.3 \times 10^6 \frac{MJ}{year} + 9.93 \times 10^6 \frac{MJ}{year} = 43.23 \times 10^6 \frac{MJ}{year}$$

This is considered as the annual savings in the energy input to the power generation and water desalination system 100 ("power plant") due to the use of solar energy which represents:

$$\frac{43.23 \times 10^6 \text{(solar energy for preheating)}}{66.22 \times 10^6 \text{(fuel energy required)}} \times 100 =$$

65.28% of the required annual energy

The annual fuel required/MW for a baseline gas turbine plant =

$$1.58 \times 10^6 \frac{kg_{fuel}}{year}$$

Annual fuel savings using the solar energy = $(65.28\%) \times 1.58 \times 10^6 \frac{kg_{fuel}}{year}$ $$= 1.03 \times 10^6 \frac{kg_{fuel}}{year} \times$$

$$\frac{1 \text{ Barrel of Oil}}{140 \text{ kg of Oil}}$$

$$= 7,363.89 \frac{\text{Barrel of Oil}}{year}$$

for a 1 MW power plant

Reductions in $CO_2$ are proportional to reductions in fuel use. Baseline power plants emit about 0.607 kg of $CO_2$ for each kWh electricity produced [5]. A 1 MW power plant that produces $$31.54 \times 10^6 \frac{MJ}{year}$$

produces $$31.54 \times 10^6 \frac{MJ}{year} \times \frac{kWh}{3.6\,MJ} = 8,761,111 \frac{kWh}{year} \text{ and emits about} =$$

$$8,761,111 \frac{kWh}{year} \times \frac{0.607\,kg_{CO_2}}{kWh} = 5,322.4 \frac{\text{ton }CO_2}{year}/MW$$

The reduction in $CO_2$ emissions is equivalent to $0.6528 \times 5,332.4 = 3481$ tons of $CO_2$ per year for every MW electric power output.

In addition to improved fuel efficiency and reduced $CO_2$ output, the power generation and water desalination system 100 may potentially have an economic benefit as well, in the form of a relatively short payback period of 1.9 years for the incremental costs and benefits.

Cost of a baseline power plant installation is about $$700 \frac{\$}{kW} = 0.7 \times 10^6\,\$/MW$$

Costs of solar tower power plants are about three times that of baseline power plants: $=2.1 \times 10^6 \$/MW$.

The incremental cost to build a solar tower 204 equipped power plant$=1.4 \times 10^6 \$/MW$ The payback period can be calculated as the ratio of the extra cost divided by the cost of the input energy savings, which equals the price of the energy produced by the solar collector system 500 and the WHRB system 300, which $$= 33.3 \times 10^6 \frac{MJ}{year} + 9.93 \times 10^6 \frac{MJ}{year} = 43.23 \times 10^6 \frac{MJ}{year} = 43.23 \times 10^3 \frac{GJ}{year}$$

Considering the price of electricity, in one example, as:

$$17 \frac{\$}{GJ}, [3, 4] \text{ the payback period} =$$

$$\frac{1.4 \times 10^6 \, \$/MW}{\left(43.23 \times 10^3 \frac{MJ}{\text{year}} \times 17 \frac{\$}{GJ}\right)/MW} = 1.9 \text{ years}$$

In another example, the power generation and water desalination system 100 may be scaled to a proportion of 100 MW, saving 736,389 barrels of oil per year while reducing $CO_2$ emissions by 348,099.072 tons per year.

In another example, the power generation and water desalination system 100 may be scaled to a proportion of 600 MW, saving 4,418,334 barrels of oil per year while reducing $CO_2$ emissions by 2,088,594.432 tons per year.

In other examples, the power generation and water desalination system 100 may be scaled in increments of 100 MW, saving 736,389 barrels of oil per 100 MW of capacity per year while reducing $CO_2$ emissions by 348,099.072 tons per 100 MW of capacity per year.

FIG. 9 is an operating diagram of a set of a power generation and water desalination process S800 performed by an operation control system, according to one example. The process S800 comprises a number of processes. The operation control system may comprise a variety of sensors and at least one computer configured to detect operating conditions, for example temperatures, $CO_2$ concentration, and power output, and operate the various systems of the power generation and water desalination system 100.

S802 represents a process of initiating system operation performed by the operation control system. Initiation of system operation may include performing systems checks, verifying systems are working, determining an operation condition of the power generation and water desalination system 100, for example confirming that temperatures, $CO_2$ concentration, and power output are occurring within expected ranges.

Upon completion of process S802 the operation control system begins continuous execution of processes S804, S806, S808, S810, S812, and S814.

S804 represents a process of monitoring data input from a variety of sources such as from sensors disposed within various systems of the power generation and water desalination system 100. Examples of readings that may be monitored include power usage, power sources, temperatures, pressures, emissions content (particularly $CO_2$), rotational speed (RPM) of machinery, power usage and output, fluid flow rates, and so forth.

S806 represents a process of comparing a power output of the solar tower 204 with that of a target power output. If the power output of the solar tower 204 is below the target power output then there is an indication that that level of solar power is not sufficient for operation of the power generation and water desalination system 100, and so the process S800 proceeds to process S808. One example of when this may occur is at sunset and available solar power declines. If the power output of the solar tower 204 is at or above the target power output then the process S800 proceeds to process S814.

In another example, process S806 may also compare the output of the solar energy collector 716 and solar collector system 500.

S808 represents a process of increasing the operating temperature of the duct burner 302 to supplement heating of steam in the WHRB system 300 before the steam is directed to the high pressure turbine 402 and the intermediate pressure turbine 404. Increased temperature of the duct burner 302 increases fuel use, and thus $CO_2$ emissions may be expected to increase.

S810 represents a process of comparing emissions flowing into the absorber 702. If the input is outside of a target range then the operation control system may proceed to S812. If the input is within the target range then the process S800 proceeds to process S814.

S812 represents a process of adjusting the rate that power, for example as a proportion of total power being used, may be drawn from the thermal energy storage system 720. A declining flow of $CO_2$ emissions into the absorber 702 may indicate the power output of the gas turbine 210 is declining. This may be due to less fuel and air being mixed in the combustion chamber 208, which may be indicative of less air compression occurring within the solar tower 204—a probable occurrence the is sun setting. In such a case, increased use of the duct burner 302 may help offset any power reduction of the solar tower 204, solar collector system 500, and solar energy collector 716.

Conversely, if the rate of power being drawn from the thermal energy storage system 720 is greater than needed, for example the sum of the available power drawn from solar sources and that drawn from the thermal energy storage system 720 is greater than the amount needed to drive the various systems of the power generation and water desalination system 100, then the operation control system may reduce the proportion of power that is drawn from the thermal energy storage system 720 to better utilize the solar power. In another example, the excess solar power may be directed to the thermal energy storage system 720 for later use.

S814 represents a process of determining whether to continue operation of process S800. If the decision is to continue operation then the operation control system may return to process S804. Otherwise, the process comes to an end.

S810 represents a process of comparing emissions flowing into the absorber 702. If the input is outside of a target range then the operation control system may proceed to S812. If the input is within the target range then the process S800 proceeds to process S814.

Thus, the foregoing discussion discloses and describes merely exemplary embodiments of the present application. As will be understood by those skilled in the art, the present disclosure may be embodied in other specific forms without departing from the spirit or essential characteristics thereof. Accordingly, the disclosure of the present application is intended to be illustrative, but not limiting on scope, including a scope of the claims. The disclosure, including any readily discernable variants of the teachings herein, define, in part, the scope of the foregoing claim terminology such that no inventive subject matter is dedicated to the public.

What is claimed is:

1. A method for operating system, the system comprising a gas turbine system including an air compressor connected to a combustion chamber, the combustion chamber connected to a gas turbine, the gas turbine connected to a first electric generator, the system further comprising a waste heat recovery boiler (WHRB) system including at least one boiler and connected to an economizer, an evaporator, and a super heater, the system further comprising a combined heat and power (CHP) generation system including a high pressure turbine, an intermediate pressure turbine, and a low pressure turbine connected to a second electric generator, the system further comprising at least one solar powered energy system, a thermal energy storage system, and a desalination system, the desalination system connected to the CHP generation system and the WHRB system, the system further comprising a carbon capture system and a plurality of proportioning valves configured to control fluid flow through the thermal energy storage system and the at least one solar powered energy system, wherein the gas turbine system is configured to generate electricity and heat, the WHRB system is connected to the gas turbine system and is configured to use exhaust from the gas turbine system to provide heat and provide steam power to the CHP generation system, the CHP generation system is configured to produce electricity and provide heat to the desalination system to produce desalinated water, and the at least one solar powered energy system is configured to provide thermal energy to at least two selected from the gas turbine system, the WHRB system, the CHP generation system, and the desalination system, wherein the carbon capture system includes an absorber, a stripper, and a heat exchange circuit for circulating a heat transfer working fluid, the heat exchange circuit comprising each of a first heat exchanger configured to heat the heat transfer working fluid and a reboiler configured to heat a lean carbon dioxide solvent output from the stripper using the heated heat transfer working fluid provided by the first heat exchanger, the carbon capture system being connected to the WHRB system and the at least one solar powered energy system, wherein the exhaust from the gas turbine system is provided to the WHRB system to recapture a portion of waste heat before being provided to the carbon capture system to separate carbon dioxide from other gases of the exhaust, wherein an output of the WHRB system provides the exhaust, from the gas turbine system, to an input of the carbon capture system at the absorber, wherein the at least one solar powered energy system is connected to the WHRB system and is configured to provide heated heat transfer fluid (HTF) to heat water of the WHRB system, the at least one solar powered energy system is connected to the carbon capture system and is configured to provide heated HTF to transfer energy to the thermal energy storage system for storage and later use and to transfer energy to the heat transfer working fluid in the heat exchange circuit to heat the heat transfer working fluid for use in heating the lean carbon dioxide solvent flowing through the reboiler from the stripper for supply of heated lean carbon dioxide solvent from the reboiler to the stripper, wherein the thermal energy storage system is configured to decouple time of collection of solar energy using the at least one solar powered energy system with time of using the collected energy to heat the lean carbon dioxide solvent output from the stripper for resupply to the stripper, and wherein the plurality of proportioning valves are coupled between the first heat exchanger of the heat exchange circuit and each of the at least one solar powered energy system and the thermal energy storage system and are electronically controllable to selectively provide heated HTF to the first heat exchanger to heat the heat transfer working fluid according to each of the following conditions, respectively: (i) heated HTF is provided to the first heat exchanger from only the at least one solar powered energy system, (ii) heated HTF is provided to the first heat exchanger from only the thermal energy storage system, (iii) heated HTF is provided to the first heat exchanger from both the at least one solar powered energy system and the thermal energy storage system, and (iv) heated HTF is not provided from either the at least one solar powered energy system or the thermal energy storage system, the method comprising:

initiating operation of the system;
monitoring a solar tower output of the at least one solar powered energy system;
comparing the solar tower output with a target value;
increasing a duct burner temperature of a duct burner of the WHRB system;
comparing emissions input to the absorber with a target range of values;
adjusting an amount of power drawn from the thermal energy storage system; and
either continuing operation of the system or halting operation of the system based on (1) the comparison between the solar tower output and the first target value and (2) the comparison between the emissions input to the absorber with the target range of values.

2. The method according to claim 1, further comprising:
comparing an output of a solar energy collector of the at least one solar powered energy system with a second target value; and/or
comparing an output of a solar collector system with a third target value.

3. A method of operating a system to generate electricity, heat, and desalinated water, the system comprising a gas turbine system including an air compressor connected to a combustion chamber, the combustion chamber connected to a gas turbine, the gas turbine connected to a first electric generator, the system further comprising a waste heat recovery boiler (WHRB) system including at least one boiler and connected to an economizer, an evaporator, and a super heater, the system further comprising a combined heat and power (CHP) generation system including a high pressure turbine, an intermediate pressure turbine, and a low pressure turbine connected to a second electric generator, the system further comprising at least one solar powered energy system, a thermal energy storage system, and a desalination system, the desalination system connected to the CHP generation system and the WHRB system, the system further comprising a carbon capture system and a plurality of proportioning valves configured to control fluid flow through the thermal energy storage system and the at least one solar powered energy system, wherein the gas turbine system is configured to generate electricity and heat, the WHRB system is connected to the gas turbine system and is configured to use exhaust from the gas turbine system to provide heat and provide steam power to the CHP generation system, the CHP generation system is configured to produce electricity and provide heat to the desalination system to produce desalinated water, and the at least one solar powered energy system is configured to provide thermal energy to at least two selected from the gas turbine system, the WHRB system, the CHP generation system, and the desalination system, wherein the carbon capture system includes an absorber, a stripper, and a heat exchange circuit for circulating a heat transfer working fluid, the heat exchange circuit comprising each of a first heat exchanger configured to heat the heat transfer working fluid and a reboiler configured to heat a lean carbon dioxide solvent output from the stripper using the heated heat transfer working fluid provided by the first heat exchanger, the carbon capture system being connected to the WHRB system and the at least one solar powered energy system, wherein the exhaust from the gas turbine system is provided to the WHRB system to recapture a portion of waste heat before being provided to the carbon capture system to separate carbon dioxide from other gases of the exhaust, wherein an output of the WHRB system provides the exhaust, from the gas turbine system, to an input of the carbon capture system at the absorber, wherein the at least one solar powered energy system is connected to the WHRB system and is configured to provide heated heat transfer fluid (HTF) to heat water of the WHRB system, the at least one solar powered energy system is connected to the carbon capture system and is configured to provide heated HTF to transfer energy to the thermal energy storage system for storage and later use and to transfer energy to the heat transfer working fluid in the heat exchange circuit to heat the heat transfer working fluid for use in heating the lean carbon dioxide solvent flowing through the reboiler from the stripper for supply of heated lean carbon dioxide solvent from the reboiler to the stripper, wherein the thermal energy storage system is configured to decouple time of collection of solar energy using the at least one solar powered energy system with time of using the collected energy to heat the lean carbon dioxide solvent output from the stripper for resupply to the stripper, and wherein the plurality of proportioning valves are coupled between the first heat exchanger of the heat exchange circuit and each of the at least one solar powered energy system and the thermal energy storage system and are electronically controllable to selectively provide heated HTF to the first heat exchanger to heat the heat transfer working fluid according to each of the following conditions, respectively: (i) heated HTF is provided to the first heat exchanger from only the at least one solar powered energy system, (ii) heated HTF is provided to the first heat exchanger from only the thermal energy storage system, (iii) heated HTF is provided to the first heat exchanger from both the at least one solar powered energy system and the thermal energy storage system, and (iv) heated HTF is not provided from either the at least one solar powered energy system or the thermal energy storage system, the method comprising:

using solar energy to heat compressed air entering the combustion chamber;

recovering exhaust heat from the exhaust from the gas turbine system using the WHRB system;

producing electricity using the second electric generator, wherein the high pressure turbine, the intermediate pressure turbine, and the low pressure turbine of the CHP generation system drives the second electric generator, and wherein the high pressure turbine, the intermediate pressure turbine, and the low pressure turbine are respective steam turbines powered by the WHRB system;

adding heat energy to at least one of the WHRB system, the CHP generation system, the desalination system, and the carbon capture system using the at least one solar powered energy system;

heating brine in the desalination system using the CHP generation system; and desalinating seawater using the desalination system.

4. The method according to claim 3, further comprising:
storing heat energy in the thermal energy storage system for supplemental use in at least one of the WHRB system, the CHP generation system, the desalination system, or the carbon capture system.

5. The method according to claim 3, further comprising:
supplementing energy provided to the WHRB system using a duct burner.

6. The method according to claim 3, further comprising:
redirecting solar power received from the at least one solar powered energy system and energy stored in the thermal energy storage system between at least one of the WHRB system, the CHP generation system, the desalination system, or the carbon capture system.

7. The method according to claim 3, further comprising:
selectively providing heat energy from the at least one solar powered energy system and the thermal energy storage system to the WHRB system and the carbon capture system.

8. The method according to claim 3, further comprising:
powering both the WHRB system and the carbon capture system simultaneously using at least one of the at least one solar powered energy system or the thermal energy storage system.

9. A system for generating electricity, heat, and desalinated water comprising:

a gas turbine system including an air compressor connected to a combustion chamber, the combustion chamber connected to a gas turbine, the gas turbine connected to a first electric generator;

a waste heat recovery boiler system including at least one boiler and connected to an economizer, an evaporator, and a super heater;

a combined heat and power (CHP) generation system including a high pressure turbine, an intermediate pressure turbine, and a low pressure turbine connected to a second electric generator;

at least one solar powered energy system;

a thermal energy storage system;

a desalination system, the desalination system connected to the CHP generation system and the waste heat recovery boiler system;

a carbon capture system; and a plurality of proportioning valves configured to control fluid flow through the thermal energy storage system and the at least one solar powered energy system, wherein:

the gas turbine system is configured to generate electricity and heat, the waste heat recovery boiler system is connected to the gas turbine system and is configured to use exhaust from the gas turbine system to provide heat and provide steam power to the CHP generation system, the CHP generation system is configured to produce electricity and provide heat to the desalination system for producing desalinated water, and the at least one solar powered energy system is configured to provide thermal energy to at least two selected from the gas turbine system, the waste heat recovery boiler system, the CHP generation system, and the desalination system, the carbon capture system includes an absorber, a stripper, and a heat exchange circuit for circulating a heat transfer working fluid, the heat exchange circuit comprising a first heat exchanger configured to heat the heat transfer working fluid, and a reboiler configured to heat a lean carbon dioxide solvent output from the stripper using the heated heat transfer working fluid provided by the first heat exchanger, the carbon capture system being connected to the waste heat recovery boiler system and the at least one solar powered energy system, the exhaust from the gas turbine system is provided to the waste heat recovery boiler system to recapture a portion of waste heat before being provided to the carbon capture system to separate carbon dioxide from other gases of the exhaust, an output of the waste heat recovery boiler system is configured to provide the exhaust, from the gas turbine system, to an input of the carbon capture system at the absorber, the at least one solar powered energy system is connected to the waste heat recovery boiler system and is configured to provide heated heat transfer fluid (HTF) to heat water of the waste heat recovery boiler system, the at least one solar powered energy system is connected to the carbon capture system and is configured to provide heated HTF to transfer energy to the thermal energy storage system for storage and later use and to transfer energy to the heat transfer working fluid in the heat exchange circuit to heat the heat transfer working fluid for use in heating the lean carbon dioxide solvent flowing through the reboiler from the stripper for supply of heated lean carbon dioxide solvent from the reboiler to the stripper, the thermal energy storage system is configured to decouple time of collection of solar energy using the at least one solar powered energy system with time of using the collected energy to heat the lean carbon dioxide solvent output from the stripper for resupply to the stripper, and the plurality of proportioning valves are coupled between the first heat exchanger of the heat exchange circuit and each of the at least one solar powered energy system and the thermal energy storage system and are electronically controllable to selectively provide heated HTF to the first heat exchanger to heat the heat transfer working fluid according to each of the following conditions, respectively: (i) heated HTF is provided to the first heat exchanger from only the at least one solar powered energy system, (ii) heated HTF is provided to the first heat exchanger from only the thermal energy storage system, (iii) heated HTF is provided to the first heat exchanger from both the at least one solar powered energy system and the thermal energy storage system, and (iv) heated HTF is not provided from either the at least one solar powered energy system or the thermal energy storage system.

10. The system according to claim 9, wherein:
the desalination system further includes a desalinator having a plurality of sections and a reverse osmosis section, the desalination system configured to direct condensation from the reverse osmosis section into the desalinator, and the desalinator is configured to be heated by the CHP generation system.

11. The system according to claim 10, wherein:
the desalination system is configured to combine condensation from the reverse osmosis section with brine recirculating to the desalinator from a rejection section of the desalination system.

12. The system according to claim 9, wherein:
the at least one solar powered energy system includes a plurality of solar troughs configured to heat the heat transfer fluid (HTF), and an HTF pump.

13. The system according to claim 12, wherein:
the plurality of solar troughs are arranged in at least one of a series arrangement or a parallel arrangement.

14. The system according to claim 12, wherein:
at least one of the at least one solar powered energy systems is connected to at least one of the economizer, the evaporator, or the super heater.

15. The system according to claim 9, wherein:
the at least one solar powered energy system includes a solar tower and a plurality of heliostats.

16. The system according to claim 9, wherein:
the at least one solar powered energy system includes a solar energy collector having a plurality of solar cells.

* * * * *